May 19, 1970  R. E. KORTUM  3,512,344
DECK ELEVATION CONTROL ASSEMBLY FOR MOWER
Filed May 22, 1968  2 Sheets-Sheet 1

Inventor
ROBERT E. KORTUM
By Cohn and Powell
Attorneys

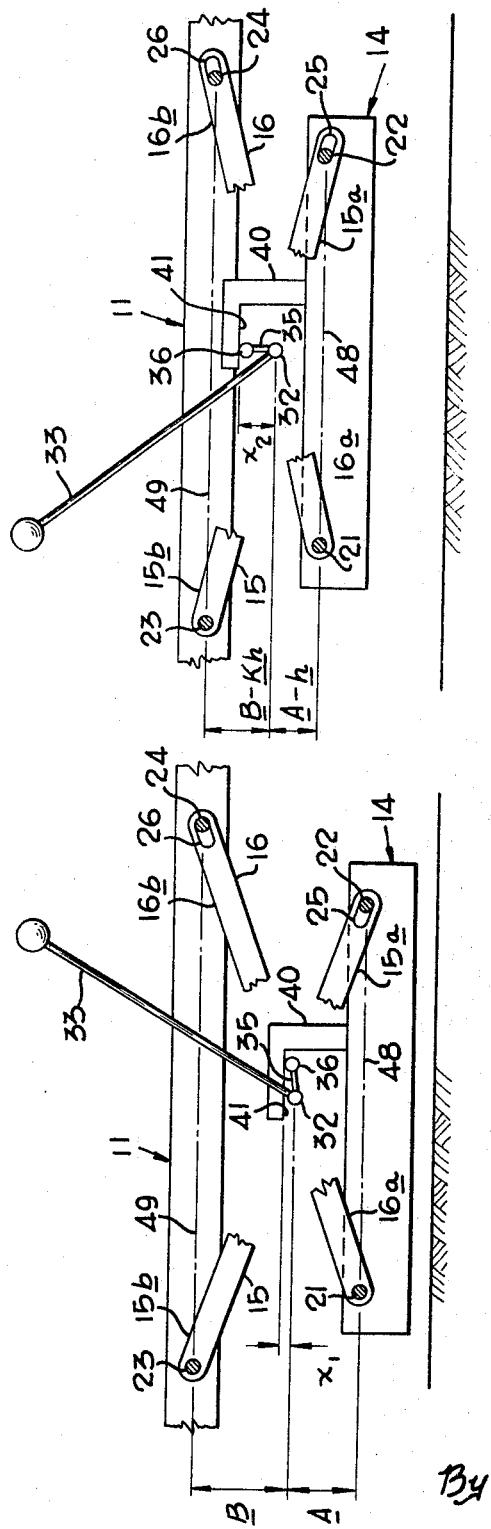

United States Patent Office 3,512,344
Patented May 19, 1970

3,512,344
DECK ELEVATION CONTROL ASSEMBLY FOR MOWER
Robert E. Kortum, Hazelwood, Mo., assignor to Atlas Tool & Manufacturing Company, St. Louis, Mo., a corporation of Missouri
Filed May 22, 1968, Ser. No. 731,251
Int. Cl. A01d 55/32
U.S. Cl. 56—25.4                  12 Claims

ABSTRACT OF THE DISCLOSURE

A deck elevation control assembly includes a frame and a deck, the deck being mounted below the frame by spaced pairs of intersecting scissor arms. An elongate shaft extends between the spaced pairs of scissor arms, and a lift control lever is attached to the shaft at one end. The shaft includes a pair of spaced cam arms which, on rotation of the control lever, engage compatible cam-engaging faces on the deck, and thereby selectively elevate both the deck and the control lever.

BACKGROUND OF THE INVENTION

This invention relates in general to lawn mowers, and in particular, to an elevation control assembly for raising the deck of a lawn mower.

Many lawn mowers, and in particular riding mowers, are equipped with a means of raising and lowering the rotary cutting head housed in the deck. For the most part, however, these devices support the deck by a chain or link assembly, the deck being lowered or raised directly. In such devices, the control handle is attached to the frame and does not undergo vertical movement of its center of rotation. This is true, whether or not any form of scissors mechanism is utilized.

At least one of the known deck suspension systems includes an articulated frame or sub-frame assembly connecting the front and rear wheels, and the deck is suspended from the articulated portions in such a way as to be raised and lowered as the articulated parts are moved relative to each other. Such an assembly inevitably requires a complicated linkage system.

SUMMARY OF THE INVENTION

The present invention includes a scissors assembly which permits the deck to be maintained substantially horizontal during the lifting process over a given elevational range. By mounting the control lever at the intersection of the scissor arms and permitting the control lever itself to move vertically by virtue of being independent of the frame and the deck permits the movement magnification capabilities, inherent in a scissor arms, to be utilized.

The deck elevation control assembly includes a frame, a deck mounted below the frame, and a pair of intersecting scissor arms mounting the deck to the frame.

A lift control lever is rotatively mounted to the scissor arms at their intersection points, and engagement means operatively attached to the control lever selectively raises the deck. The engagement means operatively engages either the deck or the frame at a point radially disposed from the intersection points whereby rotation of the control lever selectively elevates the deck.

The deck includes a cam-engaging face, and the engagement means includes a cam. The cam engages the cam-engaging face to effectuate the elevating function on rotation of the control lever. The engagement means includes an arm operatively attached to the control lever to form a bell-crank, the arm including the cam at its end.

A guide means carried by the deck selectively regulates the angular rotation of the control lever and maintains the control lever in position to set the elevation of the deck at a predetermined level.

Spaced pivot means attach the scissor arms to the deck. The triangular linkage system has a base defined by the spaced pivot means and an apex defined by the intersection of the scissor arms. Rotation of the control lever actuates the cam which engages the cam-engaging face to urge the apex toward the base.

A pair of intersecting scissor arms, one of which is preferably mounted on each side of the deck, provide the deck with lateral stability, and shaft means interconnects these spaced pairs of scissor arms at their respective intersection points.

The control lever is rotatively mounted to the shaft means, and spaced arms mounted to the shaft provide the cam means for raising the deck.

BRIEF DESCRIPTION OF THE DRAWINGS

FIG. 4 is a fragmentary schematic view illustrating the disposition of the elevation control assembly with the deck in a low position; and FIG. 5 is a fragmentary schematic view illustrating the disposition of the elevation control assembly with the deck in a raised position.

DESCRIPTION OF THE PREFERRED EMBODIMENT

Figure 2:
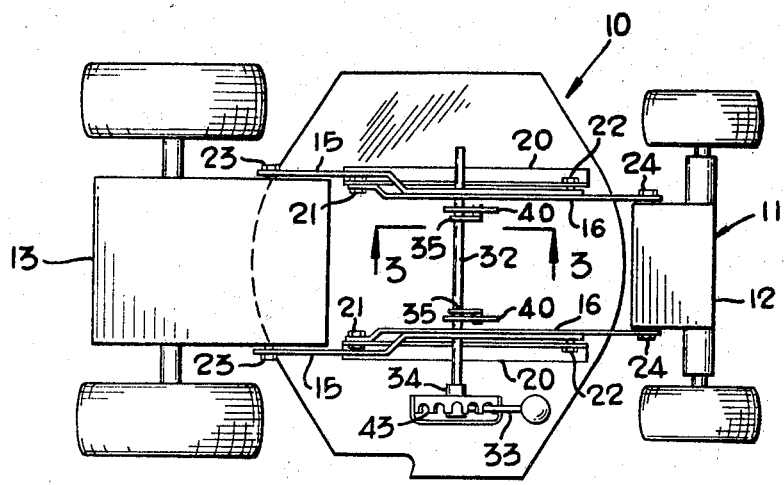
FIG. 2 is a plan view as taken on line 2—2 of FIG. 1.
Figure 1:
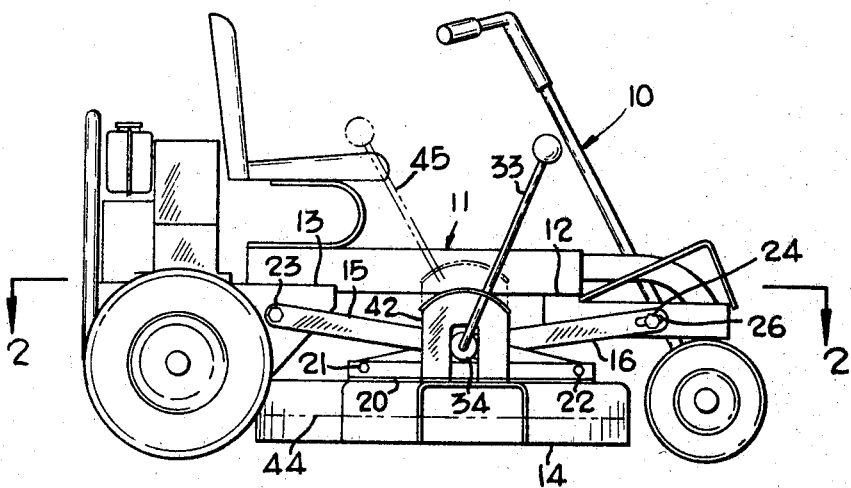
FIG. 1 is a side elevational view of a riding mower and deck-elevating assembly.

Referring now by characters of reference to the drawings, and first to FIG. 1, it will be understood that the riding mower, generally indicated by numeral 10, includes a frame 11 having a front portion 12 and a rear portion 13. The mower 10 also includes a deck 14 suspended from the frame 11 by a deck elevation control assembly.

The various structural components which make up the deck elevation control assembly are, to a large extent, duplicated on each side of the riding mower 10. For this reason corresponding parts on opposite sides which are essentially identical, are given the same reference numeral.

The deck 14 is mounted to the frame 11 by means of spaced pairs of scissor arms 15 and 16 mounted to each side of the frame 11. The scissor arm 15 is disposed relatively outward of the scissor arm 16. The individual arms 15 and 16 are suitably bent to avoid interference with each other and to facilitate attachment to the frame 11 and the deck 14 respectively.

The deck 14 includes spaced angle bars 20, provided at each side of the deck 14. Bolts 21 and 22 connected to each angle bar 20 constitute spaced pivot means connecting the lower ends of scissor arms 16 and 15, respectively. Bolts 23 and 24 connected to the rear portion 13 and the front frame portion 12 respectively constitute spaced pivot means on the frame 11 connecting the upper ends of the scissor arms 15 and 16 respectively. The upper end of the scissor arm 16 and the lower end of the scissor arm 15 are provided with slots 26 and 25 respectively as may be clearly seen from FIGS. 4 and 5. The slots 25 and 26 are located at one side of the intersection point of the associated scissor arms 15 and 16, and enable the scissor arms 15 and 16 to be opened or closed with respect to each other and yet to be mounted in pivotal relation to the frame 11 and the deck 14. The lower end of arm 16 and the upper end of the arm 15 are pivotally attached by bolts 21 and 23 to the deck and frame respectively.

Each pair of scissor arms 15 and 16 is pivoted at the intersection point of the individual arms by an elongate shaft 32, the connection of the shaft 32 constituting the intersection pivot means.

Figure 3:
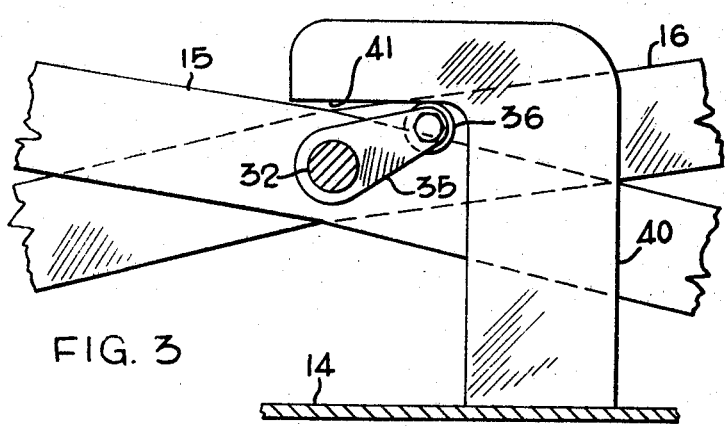
FIG. 3 is an enlarged, fragmentary elevational view as taken on line 3—3 of FIG. 2.

A control lever 33 is attached to one end of the shaft 32 by means of a hub 34. The control lever 33 is rotatable with the shaft 32 and a pair of arms 35 is mounted in spaced relation along the shaft 32. The arms 35 are fixed to the shaft 32, and in effect cooperate with the control lever 33 to form a bell-crank, the arms 35 being operatively connected to the control lever 33 by means of the shaft 32. As shown in FIG. 3, the end of each arm 35 includes a roller 36 bolted thereon and constituting a cam means.

An inverted L-shaped member 40 is welded or otherwise attached to each side of the deck and constitutes part of the deck 14. Each of the L-shaped members 40 is adjacently disposed to an associated bell-crank arm 35, and each member 40 includes a cam-engaging face 41. Rotation of the control lever 33 rotates each bell-crank arm 35, and the coacting roller 36 rides along the associated cam-engaging face 41, thereby increasing the vertical distance between the cam-engaging face 41 and the center of the shaft 32.

An inverted U-shaped guide member 42 is bolted or otherwise attached to the deck 14. The guide member 42 includes a plurality of notches 43 which retain the control lever 33 in selected positions of angular rotation. The slot formed in the guide member 42 permits the shaft 32 to move vertically as the scissor arms 15 and 16 open and close to adjust the elevation of the deck 14 from a low position, as indicated in full lines in FIG. 1, to a raised elevation indicated by the phantom line 44 representing the underside of the deck. The phantom outline 45 represents the related position of the control lever 33 when the deck 14 is at the raised elevation.

It is thought that the functional advantages of this deck elevation control assembly have become fully apparent from the foregoing description of parts, but for completeness of disclosure, the operation of the assembly will be briefly described with particular reference to FIGS. 4 and 5, which are schematic in nature, in order to better illustrate the related movement of parts.

FIG. 4 represents the deck 14 in a low position. The scissor arms 15 and 16 include a lower triangular portion and an upper triangular portion, each portion providing, as it were, a triangular frame.

The lower triangular frame is formed from link 15a and 16a and the upper triangular frame by links 15b and 16b, it being understood that these links are sub-portions of the scissor arms 15 and 16. The base of the lower triangular frame is provided by that portion of the deck 14 which extends between pivot points 21 and 22, the base of the upper triangular frame is provided by that portion of the mower frame 11 extending between pivot points 23 and 24. The apex of both frames is formed by the shaft 32.

Referring now in particular to FIG. 4, it will be observed that the distance between the cam-engaging face 41 and the lower triangular base line 48 is fixed because the L-shaped member 40 is part of the deck 14. The location of the shaft 32 is, however, vertically variable because of the cam arrangement provided by the bell-crank, formed from the control lever 33 and the arm 35. When the control lever 33 is rotated in a counterclockwise direction, the vertical distance between the cam-engaging face 41 and the shaft 32 is increased and, at the same time, the vertical distance between the shaft 32 and the base line 48 of the lower triangular frame is decreased by a like amount.

Because of the nature of the scissor arms 15 and 16, the change in height from apex 32 to base line 48 of the lower triangle frame is reflected in a proportional change of height from apex 32 to base line 49 of the upper triangular frame. This additional change results in a compounded decrease in the distance between the base lines 48 and 49. The deck 14 is therefore drawn toward the frame 11, by the sum of the changes in height of the lower triangular frame and the upper triangular frame. Suppose the initial distance between the cam-engaging face 41 and the apex 32 is $X_1$ (FIG. 4) and the final distance between the cam-engaging face 41 and the apex 32 is $X_2$. The decrease in height of the lower triangular frame between these limits is, of course, $X_2-X_1$, which for convenience will be called $h$.

Now, if the initial height of the lower triangular frame is A and that of the upper triangular frame is B, then the final heights are respectively $A-h$ and $B-Kh$, where K represents the substantially constant proportional relationship between the scissor arms 15 and 16.

The difference between the sum of the initial heights $(A+B)$ and the sum of the final heights $(A-h$, plus $B-Kh)$ is $h$ and $Kh$. This is the change in elevation of the deck 14.

It is believed that an example will aid the understanding of this compound action. It will be assumed that $X_1$ is 1″. Counterclockwise rotation of the control lever 33 will result in a change of vertical height of the lower triangular frame which depends on the length of the cam arm 35. It will be assumed that this length is such that $X_2$ is 3″ so that the change in height of the lower triangular frame is $X_2-X_1$, i.e. $3''-1''=2''$ (or $h$). If the proportional relationship of the upper and lower triangular frames is, again for the sake of example, 4 to 3, then the height of the upper triangular frame will be decreased by $Kh$ or $\frac{4}{3}\times 2''=2$ and $\frac{2}{3}''$. The apex of both triangles which is represented by shaft 32 will be drawn toward the base line 49 of the upper triangular frame by this distance of 2 and $\frac{2}{3}''$. The base line 48 of the lower triangular frame has been drawn toward the apex 32 by a distance of 2″. The apex 32 is the same for both triangular frames, and thus the base of the lower triangular frame is drawn toward the base of the upper triangular frame by the compounded distance, namely 2 and $\frac{2}{3}''$ plus $2=4$ and $\frac{2}{3}''$ total. Thus, the deck 13 is raised by 4 and $\frac{2}{3}''$.

If, as in the usual type of lawn mower, the shaft 32 were mounted to the frame independently of the scissor arms 15 and 16, then movement of the arm 35 by 2″ vertically would simply result in a raising of the elevation of the deck 14 by 2″. The present invention thus elevates the deck to a much greater extent for the same rotation of the lever 33.

It will be understood that the above description is a simplification which does not take into account the necessary slots 25 and 26 in the scissor arms 15 and 16 respectively which enables movement to take place. However, because of the relative flatness of the slope of the arms 15 and 16, such slots 25 and 26 do not significantly affect the vertical movement as described above.

In the preferred embodiment, the L-shaped member 40 is part of the deck 14. It could easily be made part of the frame 11 without departing from the invention. Moreover, a pulley and chain arrangement could be substituted for the bell-crank in a manner which would likewise provide no departure from the spirit of the invention.

I claim as my invention:
1. A deck elevation control assembly in a mower, comprising:
 (a) a frame means,
 (b) a deck means below the frame means,
 (c) a pair of intersecting scissor arms, including pivot means at their intersection, the arms mounting the deck means to the frame means,
 (d) a lift control lever rotatively mounted to the scissors at the pivot means, and
 (e) engagement means operatively attached to the control lever for relatively moving the deck means and frame means, the engagement means engaging one of the last said means at a point substantially radially disposed from the pivot means whereby rotation of the control lever selectively elevates the deck means and the control lever, and urges the deck means toward the frame means.

2. An assembly as defined in claim 1, in which:
(f) the deck means includes a cam-engaging face, and
(g) the engagement means includes a cam engaging the cam-engaging face to effectuate the elevating function.

3. An assembly as defined in claim 1, in which:
(f) the deck means includes a cam-engaging face,
(g) the engagement means includes an arm operatively attached to the control lever to provide a bell-crank, and
(h) the arm includes a cam engaging the cam-engaging face to effectuate the elevation function.

4. An assembly as defined in claim 1, in which:
(f) the deck means includes guide means selectively regulating the adjustable, angular rotation of the control lever.

5. An assembly as defined in claim 1, in which:
(f) spaced pivot means connects the scissor arms to the deck means,
(g) the scissor arms include a lower triangular linkage system having a base defined by the spaced pivot means and an apex defined by the scissor arm intersection pivot means,
(h) the deck means includes a cam-engaging face disposed in spaced relation from the base, and
(i) the engagement means includes a cam engaging the cam-engaging face to urge the apex toward the base whereby to effectuate the elevating function.

6. An assembly as defined in claim 5, in which:
(j) spaced pivot means connects the scissor arms to the frame means,
(k) the scissor arms include an upper triangular linkage system having a base defined by the spaced pivot means on the frame means and a common apex with the lower triangular linkage system,
(l) each scissor arm includes a slot at one end, the slots being on one side of the intersection pivot means, the slot in one arm receiving the frame pivot means and the slot in the other arm receiving the deck pivot means.

7. An assembly as defined in claim 1, in which:
(f) the deck means and frame means are substantially parallel,
(g) spaced pivot means connects the scissor arms to one of the last said means,
(h) a cam-engaging face carried on the last said one means,
(i) the scissor arms include a triangular linkage system having a base defined by the spaced pivot means and an apex defined by the scissor arms intersection pivot means,
(j) the engagement means includes an arm attached to the control lever, the arm having a cam engaging the cam-engaging face to urge the apex toward the base whereby to effectuate the elevating function, and
(k) guide means, adapted to be attached to the mower, and including means selectively regulating the angular rotation of the control lever to adjusted, predetermined locations.

8. A deck elevation control assembly, for a mower, comprising:
(a) a frame means,
(b) a deck means including opposing sides,
(c) spaced pairs of intersecting scissor arms mounting opposing sides of the deck means to the frame means, each pair of intersecting scissor arms including pivot means at their intersection,
(d) shaft means interconnecting the spaced pairs of intersecting scissor arms at their respective intersection pivot means,
(e) a lift control lever rotatively mounted to the shaft means, and
(f) engagement means operatively attached to the control lever for relatively moving the deck means and frame means, the engagement means engaging one of the last said means at a point substantially radially disposed from the pivot means whereby rotation of the control lever selectively elevates the deck means and the shaft means, and urges the deck means toward the frame means.

9. An assembly as defined in claim 8, in which:
(g) the deck means and the frame means are substantially parallel,
(h) spaced cam-engaging faces carried by one of the last said means adjacent to associated pairs of intersecting scissor arms, and
(i) the engagement means includes a pair of cams mounted on the shaft in spaced relation, each cam engaging an associated cam-engaging face to effectuate the elevating function.

10. An assembly as defined in claim 8, in which:
(g) spaced cam-engaging faces carried by the deck means, each of said faces being adjacent an associated pair of intersecting scissor arms,
(h) the engagement means includes a pair of arms mounted on the shaft means in spaced relation, each arm being located adjacent as associated cam-engaging face, and
(i) each arm includes a cam engaging the associated cam-engaging face to effectuate the elevation function.

11. An assembly as defined in claim 8, in which:
(g) spaced pivot means carried by opposite sides of the deck means,
(h) each pair of intersecting arms includes a lower triangular linkage system having a base defined by the spaced deck pivot means and an apex defined by the shaft means,
(i) spaced cam-engaging faces carried by the deck means, each of the cam-engaging faces being disposed in substantially fixed relation from the base of an adjacent associated pair of intersecting scissor arms, and
(j) the engagement means includes a pair of arms mounted on the shaft means in spaced relation, each arm providing a cam engaging an associated cam-engaging face to urge the shaft means toward the base whereby to effectuate the elevating function.

12. An assembly as defined in claim 11, in which:
(k) guide means carried by the deck means engaging the control lever in selected positions of angular rotation to maintain the deck means at predetermined elevations.

References Cited

UNITED STATES PATENTS

| | | | |
|---|---|---|---|
| 2,945,338 | 7/1960 | Burrow et al. | 56—25.4 |
| 3,126,689 | 3/1964 | Walker et al. | 56—25.4 |
| 3,269,100 | 8/1966 | Smith | 56—25.4 |
| 3,283,486 | 11/1966 | Marek et al. | 56—25.4 |
| 3,357,165 | 12/1967 | Thon | 56—25.4 |

F. BARRY SHAY, Primary Examiner

J. A. OLIFF, Assistant Examiner